United States Patent Office 3,016,400
Patented Jan. 9, 1962

---

3,016,400
4,4'-(1,1,2,2-TETRAMETHYLETHYLENE)-DIBENZOIC ACID
John C. Petropoulos, Norwalk, Conn., assignor to American Cyanamid Company, New York, N.Y., a corporation of Maine
No Drawing. Filed July 21, 1958, Ser. No. 750,048
1 Claim. (Cl. 260—515)

This invention relates to a novel group of 1,1,2,2-tetramethyl ethylene dibenzoic acids and to the process of preparing the same. Still further, this invention relates to a novel group of 1,1,2,2-tetramethyl ethylene dibenzoic acids useful in the preparation of oil-modified alkyd resins, unsaturated polyester resins, among other resinous materials prepared therefrom.

One of the objects of the present invention is to produce a novel group of 1,1,2,2-tetramethyl ethylene dibenzoic acids. A further object of the present invention is to produce a novel group of 1,1,2,2-tetramethyl ethylene dibenzoic acids that will have utility particularly in the field of oil-modified alkyd resins and other resinous materials. These and other objects of the present invention will be discussed in greater detail hereinbelow.

This application is a continuation-in-part application of my earlier filed application having the Serial No. 523,355 filed July 20, 1955, now U.S. Patent No. 2,848,486, entitled "4,4'-(2,2-butylidene)dibenzoic acid."

In the preparation of the novel dicarboxylic acids of the present invention, certain ditolyl tetramethyl ethanes are oxidized to the corresponding dibenzoic acids. The ditolyl tetramethyl ethanes used in the present invention may be prepared by dimerizing a cymene such as para-cymene in the presence of a peroxide catalyst. If one wishes to avoid the preparation of the ditolyl 1,1,2 tetramethyl ethane, one may prepare the acid by alkylating an isopropyl benzoic acid such as para-isopropyl benzoic acid with an alcohol such as methanol to form the dimethyl ester of para-isopropyl benzoic acid and dimerizing the methyl ester thus produced in the presence of a peroxide catalyst such as ditertiary butyl peroxide and saponifying the resulting dimethyl ester with sodium hydroxide. For most purposes, it is preferred to produce the 1,1,2,2-tetramethyl-1,2-ditolyl ethanes. Among the substituted ethanes which may be used to make the novel bis-benzoic acids of the present invention are 1,1,2,2-tetramethyl-1,2-di(p-tolyl)ethane; 1,1,2,2-tetramethyl-1,2-di(o-tolyl)ethane; 1,1,2,2-tetramethyl-1,2-di(m-tolyl)ethane; 1,1,2,2-tetramethyl-1,2-di(o,p-tolyl)ethane; 1,1,2,2-tetramethyl-1,2-di(o,m-tolyl)ethane; 1,1,2,2-tetramethyl-1,2-di(m,p-tolyl)ethane. These tolyl ethanes are then subjected to oxidation conditions such as disclosed in my parent application referred to hereinabove and the methyl groups directly attached to the rings are oxidized to the corresponding carboxyl groups.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claim.

Example 1

Into a suitable reaction vessel equipped with thermometer, stirrer and reflux condenser, there is introduced 20 parts of 1,1,2,2-tetramethyl-1,2-di(p-tolyl)ethane, 600 parts of acetic acid, 600 parts of water, 140 parts of chromic acid and 180 parts of sulfuric acid. The charged mixture is heated at the reflux temperature for about 22 hours. Dilution of the system with water caused 20 parts of a solid material to precipitate which had a neutral equivalent of 113. The crude solid which precipitated was treated with alkali yielding two fractions; the first fraction (a) was soluble in cold alkali, whereas the second fraction (b) was soluble in hot alkali. The latter fraction (b), on acidification, gave a solid acid which, after purification by crystallization from acetic acid, melted at 218–19° C. uncorrected. The analysis and infrared spectrum on this material are compatible with the monobasic acid having the following formula: 1,1,2,2-tetramethyl-1-(p-tolyl)-2-(p-carboxyphenyl) - ethane. Analysis calculated for $C_{20}H_{24}O_2$; C, 81.04; H, 8.16; —COOH, 15.19. Found: C, 81.30; H, 8.23; —COOH, 14.88. The acidification of fraction (a) gave a white solid of a melting point of greater than 300° C. This material was found to be insoluble in most of the common solvents. In order to facilitate purification, this material was converted into the more soluble di-methyl ester derivative by treatment with excess methanol and dry halogen chloride. Concentration of the methanol solution gave colorless prisms, which after crystallization from methanol melted at 218° C. uncorrected. The analysis and infrared spectrum of this material are compatible with the compound dimethyl 4,4' - (1,1,2,2 - tetramethylethylene)dibenzoate. Calculated for $C_{22}H_{26}O_4$; C, 74.55; H, 7.40; saponification number 177. Found: C, 74.47; H, 7.59; saponification number 172. The hydrolysis of the dimethyl ester is accomplished by refluxing the same in methanolic potassium hydroxide followed by acidification with hydrochloric acid to give a solid having a melting point greater than 300° C. Analysis and infrared spectroscopy demonstrated this material to be the di-acid derivative of the above-identified dimethyl ester and was found to be 4,4'-(1,1,2,2-tetramethylethylene)dibenzoic acid. The dimethyl ester of said bis-benzoic acid is then saponified in the presence of sodium hydroxide to produce 4,4'-(1,1,2,2-tetramethylethylene)dibenzoic acid.

Example 2

Example 1 is repeated in all details except that in the place of the 1,1,2,2-tetramethyl - 1,2 - di(p-tolyl)ethane, there is substituted an equivalent amount of 1,1,2,2-tetramethyl-1,2-di(m-tolyl)ethane. The resultant acid was found to be 3,3'-(1,1,2,2-tetramethylethylene)dibenzoic acid.

Among the dicarboxylic acids which may be prepared in accordance with the concepts of the present invention are 4,4' - (1,1,2,2 - tetramethylethylene)dibenzoic acid; 3,3' - (1,1,2,2 - tetramethylethylene)dibenzoic acid; 2,2'-(1,1,2,2-tetramethyethylene)dibenzoic acid; 4,3'-(1,1,2,2-tetramethylethylene)dibenzoic acid; 4,2' - (1,1,2,2 - tetramethylethylene)dibenzoic acid, and the like.

The following examples illustrate methods for the preparation of alkyd resins using the novel dicarboxylic acids of the present invention. Unless otherwise indicated, all parts are parts by weight. These examples, as in the preceding instances, are set forth primarily for the purpose of illustration and any specific enumeration of detail contained therein should not be interpreted as a limitation on the case except as is indicated in the appended claim.

Example 3

Into a suitable reaction vessel equipped with thermometer, stirrer and inlet and outlet tubes for the passage of inert gases therethrough, there is introduced 708 parts of dimethyl 4,4' - (1,1,2,2 - tetramethylethylene)dibenzoate, 294 parts of the methyl esters of dehydrated castor oil fatty acids, 187 parts of pentaerythritol and 4.5 parts of lead octoate. The charge is heated under a blanket of nitrogen gas to 190–200° C. whereupon methanol is continuously removed. The reaction is stopped short of gelation. The resin is diluted with Cellosolve acetate to a solids content of about 50%.

*Example 4*

Example 3 is repeated in substantially all details except that in the place of the dimethyl-4,4'-(1,1,2,2-tetramethylethylene)dibenzoate, there is substituted an equivalent amount of 3,3'-(1,1,2,2-tetramethylethylene)dibenzoic acid and in the place of the methyl esters of dehydrated castor oil fatty acids, there is substituted an equivalent amount of dehydrated castor oil fatty acids.

In addition to using the novel dicarboxylic acids of the present invention for the preparation of alkyd resins for surface coatings, these dicarboxylic acids may be used for the preparation of linear polyester resins by reacting with difunctional glycols such as ethylene glycol, diethylene glycol, propylene glycol and the like. Additionally, these linear polyester or alkyd resins prepared by using the novel dicarboxylic acids of the present invention may be used in the coating of paper and in the treatment of textile materials, such as natural or synthetic fibrous materials or the fabrics produced therefrom. Still further, these polyesters and alkyds may be utilized in the treatment of leather. They may further be used as adhesive materials or in molding compositions or in the preparation of synthetic fibers.

The novel dicarboxylic acids of the present invention may be further modified in order to produce substituted dicarboxylic acids for particular purposes. For instance, if halogenated acids are desired such as those which are utilized in the preparation of fire-resistant alkyd resins, the fundamental dicarboxylic acids of the present invention may be nuclearly halogenated with chlorine, bromine, iodine and/or fluorine. It is possible to oxidize the halo-substituted ditolyl alkanes, described in detail hereinabove, to produce the novel dicarboxylic acids of the present invention but because of the risk of side reactions and other complications, it is preferred to oxidize the ditolyl alkanes to the dicarboxylic acids first and then to halogenate whenever a nuclear substituted halo dicarboxylic acid is desired.

I claim:
4,4'-(1,1,2,2-tetramethylethylene)dibenzoic acid.

References Cited in the file of this patent
UNITED STATES PATENTS

| | | |
|---|---|---|
| 2,836,579 | Schweitzer | May 27, 1958 |
| 2,848,486 | Petropoulos | Aug. 19, 1958 |

OTHER REFERENCES

Beilstein, vol. 48, page 934; supplement I, page 410 (1926).

UNITED STATES PATENT OFFICE
CERTIFICATE OF CORRECTION

Patent No. 3,016,400                            January 9, 1962

John C. Petropoulos

It is hereby certified that error appears in the above numbered patent requiring correction and that the said Letters Patent should read as corrected below.

Column 2, line 20, for "halogen" read -- hydrogen --.

Signed and sealed this 10th day of July 1962.

(SEAL)
Attest:

ERNEST W. SWIDER
Attesting Officer

DAVID L. LADD
Commissioner of Patents